Nov. 19, 1963  E. A. CLIFTON  3,111,210
THROTTLE VALVE CONTROL MECHANISM
Filed Jan. 7, 1960  3 Sheets-Sheet 1

INVENTOR
Ernest A. Clifton
BY Cushman, Darby & Cushman
ATTORNEYS

Nov. 19, 1963   E. A. CLIFTON   3,111,210
THROTTLE VALVE CONTROL MECHANISM
Filed Jan. 7, 1960   3 Sheets-Sheet 2

INVENTOR
Ernest A. Clifton
BY Cushman, Darby & Cushman
ATTORNEYS

Nov. 19, 1963   E. A. CLIFTON   3,111,210
THROTTLE VALVE CONTROL MECHANISM
Filed Jan. 7, 1960   3 Sheets-Sheet 3

INVENTOR
Ernest A. Clifton
BY Cushman, Darby & Cushman
ATTORNEYS

United States Patent Office 3,111,210
Patented Nov. 19, 1963

3,111,210
THROTTLE VALVE CONTROL MECHANISM
Ernest A. Clifton, 1891 Oneida Court, Windsor,
Ontario, Canada
Filed Jan. 7, 1960, Ser. No. 1,024
15 Claims. (Cl. 192—3)

This invention relates to a throttle valve control mechanism for selectably providing a constant throttle setting for the engine of an automotive vehicle or the like.

Various control mechanisms have been proposed in an attempt to arrive at a simple and relatively inexpensive device for providing a constant throttle setting which can be overruled either for purposes of acceleration or deceleration. However these mechanisms have generally involved complicated and/or expensive electrical, pneumatic or hydraulic arrangements and in some cases a combination of two or more of these systems has been used. Previous devices of this nature have also often been dependent upon a separate pneumatic or hydraulic system apart from those associated with the normal operation of a vehicle.

Accordingly an object of this invention is to permit the operator of a vehicle to set the fuel control of the vehicle in a preselected, manually adjustable, fixed position so that the carburetor is provided with a constant throttle valve setting independent from and complementary to that of the normal accelerator pedal control.

Thus the present invention pertains to a constant throttle setting system which may be preset and engaged manually by the vehicle operator and in which the preset position of the carburetor butterfly valve is maintained by the vacuum of the engine, disengagement being dependent upon either a change in fluid pressure as controlled by the brake pedal or alternatively manual means, should such be desired.

One of the advantages of this invention is that it eliminates the necessity of the operator constantly using his foot to control the positioning of the carburetor valve control lever. Thus a more restful ride is permitted and at the same time a more economical operation of the vehicle is provided by a constant throttle setting which would otherwise be most difficult and tiring to maintain.

Another advantage of this invention is that although the operator of the vehicle may be favoured with a constant throttle setting he is at the same time in complete control of the vehicle in that he may brake or accelerate in the normal manner.

A further advantage of this invention is that it is relatively simple in construction and thus can be economically manufactured, installed, and maintained.

Thus according to one of its aspects the present invention concerns a throttle valve control mechanism for selectably providing a constant predetermined setting for the engine of a vehicle having a fluid operated braking system, said mechanism comprising manually actuable means for maintaining the throttle valve of said engine at a predetermined setting and means responsive to a change in the fluid pressure in said braking system for disengaging said maintaining means.

FIGURE 1 is a plan view in cross-section showing the control valve unit of the subject invention in "off" position.

FIGURE 2 is a plan view showing in cross-section the body 11 and mounting nut 2 of FIGURE 1 mounted on the instrument panel or dashboard 12.

Figure 12:
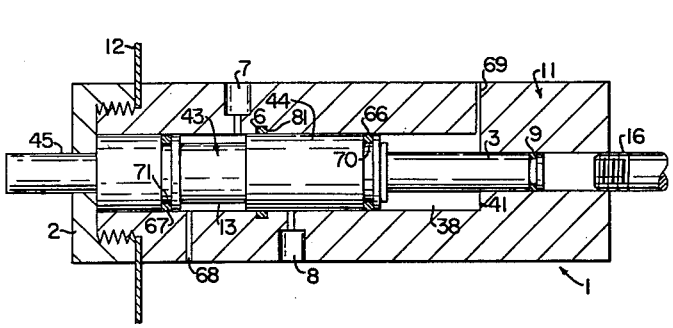

FIGURE 12 is an illustration of a slightly different embodiment of the control valve unit of the invention showing the spools 43 and piston 3 and hydraulic line 16 in elevation, and the body 11, the mounting nut 2 and the various O rings in cross-section.

Figure 13:
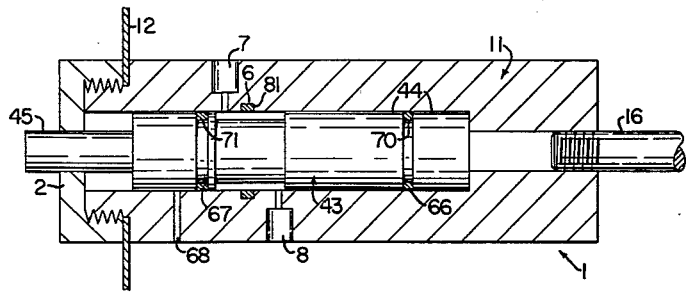

FIGURE 13 is the same view as FIGURE 12, but shows still another somewhat simplified version of the control valve unit in "on" position.

Figure 14:
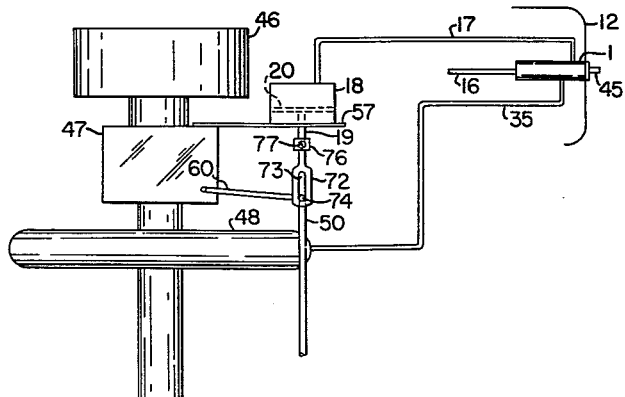

FIGURE 14 is a side-elevational view showing a somewhat simpler installation of the invention.

Figure 15:
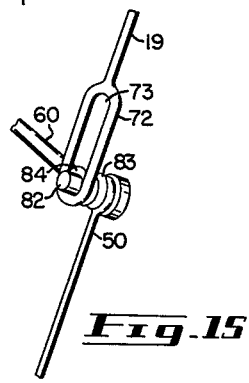

FIGURE 15 is a perspective view showing the operative arrangement of rods 19, 50 and 60 on an enlarged scale.

Referring now to the drawings, wherein like numerals designate similar parts throughout the various views, 1 designates the control valve unit of the invention. This control valve unit comprises longitudinally bored body member 11 with spool 43 and piston 3 slidably mounted therein and mounting nut 2 threaded thereon for completion and mounting of the assembly.

Referring now to FIGURES 1 through 7, it will be seen that the body 11 of the control valve unit is mounted on the instrument panel or dashboard 12 via the threaded union 37 with mounting nut 2. The body 11 is cylindrically bored throughout its length as shown at 38 and 40 and the spool 43 and piston 3 are mounted end to end therein in their respective positions, the shoulder 41 of the body and shoulder 42 of the mounting nut acting to maintain the assembly intact and also acting as stops for the critical positioning of the spool 43 when same is in "on" and "off" position respectively as will be explained hereinafter.

The body 11 is provided with port 8 which is connected via threaded insert 33 and threaded coupling 34 to tube 35 which in turn is connected to the engine intake manifold. A further port, indicated by numeral 7, is connected via threaded insert 28 and threaded coupling 29 to tubing 17 which in turn is connected at its other end via a threaded insert 22 and threaded coupling 23 to vacuum cylinder 18. Body 11 is also provided with a breather hole 38a which provides constant communication between the atmosphere and the inner end of bore 38 as shown to prevent any pressure buildup in bore 38 when the device is moved to its "on" position. The vacuum cylinder 18 is provided with a piston 20 and an associated piston rod 19, the positioning of which, during engagement of the control valve unit, acts to maintain the predetermined constant throttle setting. For purposes of clarity the tubes 17 and 35 will hereafter be referred to in the description as vacuum lines.

The cylindrical bore 40 of the body 11 is in direct communication with the master cylinder of the vehicle's hydraulic brake system, or, if the vehicle is provided with pneumatic brakes with a line leading to one of the wheel brake cylinders; this being accomplished via fluid line 16 which is attached to the outer end of the bore 40 via the threaded union 10 with threaded insert 25 and threaded coupling 26. Fluid line 16 is connected (see FIG. 1) to a T-junction 90 introduced in the hydraulic fluid supply line 91 going from the vehicle brake master cylinder 92 to the wheel brake cylinders (not shown). When the master cylinder is actuated by linkage 93 connected to the brake pedal 94, fluid pressure is therefore transmitted to fluid line 16 as well as to the wheel brake cylinder in the normal fashion.

A vacuum relief for the system is positioned in the body and is in the form of a ball valve comprising port 36 which is narrowed at its mouth to form a seat 32 for the ball 4 which is prevented from escaping by a threaded hollow insert 31.

The sliding spool 43 is undercut at 13 and 13', the peripheral ridge 14 formed thereby serving to unseat ball 4 so that atmospheric pressure has access via undercut 13 and vacuum line 17 to the vacuum cylinder 18 when the spool 43 is in "off" position. The end 45 of the spool 43 is somewhat reduced in diameter and protrudes through a central hole 39 formed in the mounting nut 2. This extension 45 of the spool 43 is the control button whereby the operator of the vehicle can engage the device. The sliding spool is further provided with peripheral grooves 30 and 30a wherein there are seated sealing of O rings 5 and 5a, the former ring 5 ensuring against undesirable leakage through the hole 39 in the mounting nut 2 and the latter ring 5a ensuring against undesirable leakage between breather hole 38a and ports 7 and 8.

Figure 1:
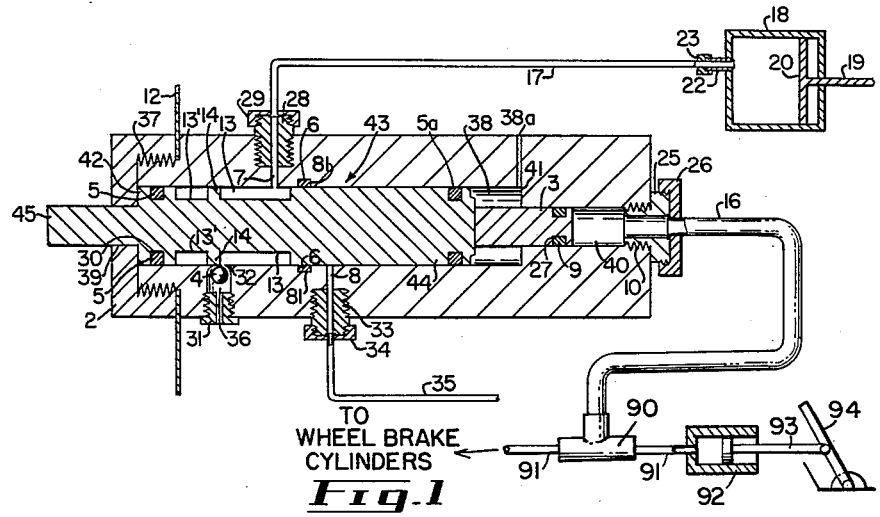
Figure 2:
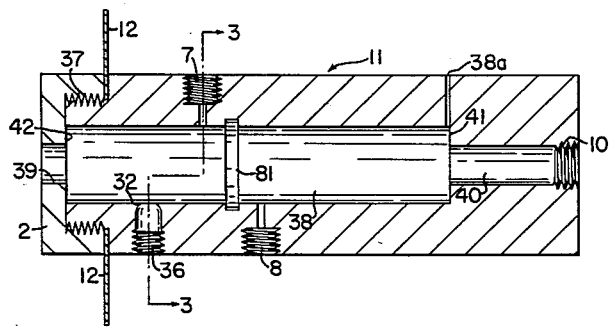
Figure 3:
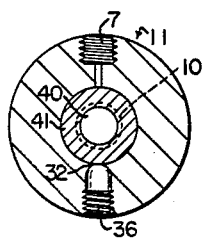
FIGURE 3 is a sectional view taken along the line 3—3 shown in FIGURE 2.
Figure 4:
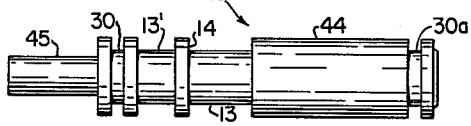
FIGURE 4 is a side-elevational view of spool 43.
Figures 5, 6:
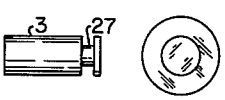
FIGURE 5 is a side-elevational view of piston 3.
FIGURE 6 is an end view of the spool shown in FIGURE 4.
Figure 7:
FIGURE 7 is an end view of the piston shown in FIGURE 5.

The sliding piston 3 also has a peripheral groove 27 wherein there is seated a sealing ring or O ring 9 for the purpose of preventing leakage of the hydraulic brake fluid or air leakage if the device is attached to a pneumatic brake system. A similar peripheral groove 81 and sealing ring 6 arrangement is positioned in the inner wall of the body 11 and is disposed in such a position as to complete the seal between the two vacuum ports when the control valve is in the "off" position as shown in FIGURE 1.

Figure 8:
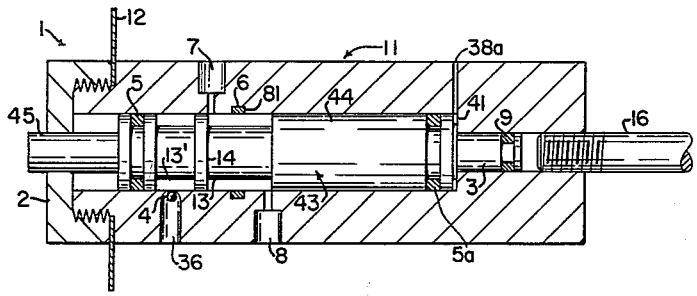
FIGURE 8 is a simplified plan view of the control valve unit in "on" position showing the body, the mounting nut and the various O rings in horizontal cross-section.

FIGURE 8 shows a somewhat simplified view of the control valve unit in "on" position, the vacuum lines and their connections and various other details having been omitted.

Figures 9, 10:
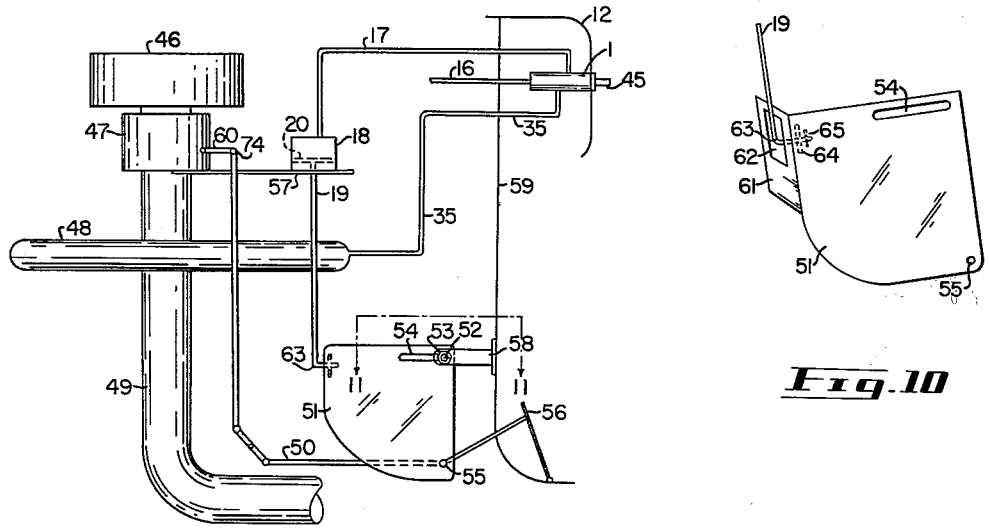
FIGURE 9 is a side-elevational view showing an installation of the invention.
FIGURE 10 is a perspective view showing the linkage plate 51 on an enlarged scale.

In FIGURE 9 the air filter 46, carburetor 47 with throttle lever 60, intake manifold 48, exhaust manifold 49, and accelerator linkage 50 of an automotive vehicle are shown in combination with an installation of the invention. In this installation the control valve unit 1 is mounted on the instrument panel or dashboard 12 and the vacuum cylinder 18 is conveniently mounted on a supporting bracket 57 which is attached in a suitable manner to the underside of the carburetor. A linkage plate 51 is pivotally mounted on the fire wall 59 of the vehicle by way of the bracket 58 and the nut and bolt 53 and 52. The linkage plate 51 is also pivotally attached at 55 to the accelerator linkage 50, and is best seen in FIGURE 10 is slidably attached to the end of rod 19. To facilitate this slidable connection between the linkage plate 51 and the end of rod 19 the leading edge of the linkage plate is bent at right angles as shown at 61 and in this leading edge there is formed a slot 62. The end of the piston rod 19 is bent over at right angles at 63 and protrudes through the slot 62 of the linkage plate 51. The end of the rod 19 is loosely held in this position by a washer 64 and cotter pin 65, the washer 64 being larger in diameter than the width of the slot 62. This arrangement is such that although the rod 19 and linkage plate 51 are firmly connected to one another they are permitted to slide vertically in relation to one another thus providing a form of lost motion connection.

In operation the system is engaged by pressing the button 45 all the way in so that the inner end of the spool 43 rests against the shoulder 41 of the body 11 as shown in FIGURE 8 of the drawings. When the spool 43 of the control valve unit 1 is in this position the undercut 13 of the spool is in line with both port 7 and port 8, thus providing an open passageway between the two vacuum lines 17 and 35 and causing the piston 20 and its associated rod 19 to be drawn into the vacuum cylinder 18 and held in this position by the force of the vacuum from the engine intake manifold.

In the installation shown in FIGURE 9 the rod 19 is drawn upwards the full height of the vacuum cylinder 18 when the button 45 of the control valve unit 1 is pressed inwardly as just described. The raising of the rod 19 in this manner causes the linkage plate 51 in turn to be rotated about the bolt 52 so that the accelerator linkage 50 connected to the linkage plate 51 at the pivot point 55 is actuated and the throttle lever 60 is raised accordingly and held in a fixed posiiton. This fixed position of the throttle lever depends upon the degree to which it has been caused to be raised by the pivoting of the linkage plate 51 and since the rod 19 is raised the full height of the vacuum cylinder 18 when the control valve unit is engaged in this installation, it will be seen that the distance that the end of the throttle lever is raised is determined by the ratio of the distance from the pivot bolt 52 to the pivot point 55 as compared to the distance from the pivot bolt 52 to the leading edge 61 of the linkage plate 51 and that the exact distance that the end of the throttle lever 60 is raised is in fact the length of the full stroke of the piston 20 multiplied by the ratio described.

Figure 11:
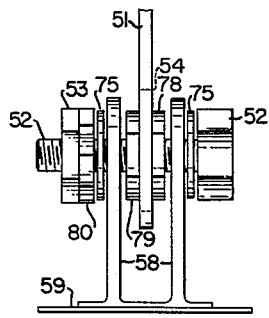
FIGURE 11 is a plan view taken along the line 11—11 shown in FIGURE 9.

To permit the preselection of any desirable constant throttle setting an adjustable arrangement for changing the effective ratio is provided by way of the slot 54 in the linkage plate 51. The mounting arrangement for the linkage plate 51 is shown in detail in FIGURE 11 which shows the bracket 58 affixed to the fire wall 59 and the linkage plate 51 pivotally mounted in the bracket via the bolt 52 and nut 80 which is locked thereon by nut 53. Washers 75 are also included in this arrangement. The linkage plate 51 is fixedly mounted on the bolt 52 by the locking action of the nuts 78 and 79. To change the constant throttle setting the nuts 78 and 79 are loosened off of the plate 51 and the plate is moved in either direction along the line of the slot 54 to the desired new position whereupon the nuts 78 and 79 are again locked on the linkage plate 51. In order to increase the constant throttle setting the linkage plate 51 is moved rearwardly towards the fire wall and if a decrease in the constant throttle setting is desired the plate is moved forwardly away from the fire wall.

Should the operator of the vehicle wish to increase the fuel mixture supply for any reason while the constant throttle system is engaged, he need only depress the accelerator pedal in the normal manner since the slot 62 in the leading edge 61 of the linkage plate 51 permits the leading edge of the linkage plate to be moved upwardly in relation to its positioning with the end of the rod 19 so that the linkage plate 51 may be rotated a greater distance than the mere length of the piston stroke of the vacuum cylinder 18. If the operator then wants to return to the constant throttle setting he merely has to take his foot off of the accelerator pedal 56 and the spring (not shown) of the accelerator linkage system will cause the linkage system to be returned until the top of the slot 62 in the linkage plate rests on the end of the rod 19 and the throttle lever 60 is in the chosen preset position.

Should the operator of the vehicle wish to brake in order to slow down or come to a complete halt when the constant throttle setting is engaged, he is not inconvenienced in any way since it is only necessary for him to step on the brake pedal in the usual manner, this action serving to automatically disengage the constant throttle control valve because of the increased pressure of the hydraulic brake fluid which pushes the piston 3 and spool 43 of the control valve unit 1 back into the "off" position. FIGURE 1 shows the control valve unit in the "off" position, and it will be seen that by pressing the brake and placing the spool in this position the automatic valve control unit is instantaneously disengaged because of the neutralization of the vacuum in the vacuum cylinder 18. This neutralization of the vacuum is caused by the entrance of atmospheric pressure through the vacuum relief port 36 and undercut 13 to the port 7, the peripheral ridge 14 of the spool at this time being in such a position as to hold the ball 4 of its seat. When the system is thus disengaged and the vacuum therein released, the rod 19 drops down so that the linkage plate 51 is free to move with the accelerator linkage which of course is being returned by the accelerator linkage spring (not shown) because of the absence of any pressure on the accelerator pedal by the operator's foot which is preoccupied with applying pressure to the brake pedal (not shown).

The operator of the vehicle which is running under the influence of the constant throttle setting of this invention can, at will, disengage the system at any time by depressing the brake pedal slightly or, if he so chooses, by pulling the button 45 out with his hand so that the spool 43 is returned to the "off" position.

The control valve unit 1 shown in FIGURE 12 is somewhat different from that shown in FIGURE 1 and FIGURE 8 in that the vacuum relief ball valve arrangement has been replaced by a vacuum relief hole 68 and the undercut portion 13' of the spool and O ring 5 have been omitted, a peripheral groove 71 with O ring 67 being positioned close to the undercut 13 in their stead. A breather hole 69 in the body 11 has also been provided for the bore 38 and the spool 43 has an additional peripheral groove 70 and O ring 66 near its inner end to ensure the sealing off of the breather hole from the remaining internal structure of the control valve unit.

The somewhat simplified embodiment shown in FIGURE 13 is the same as that shown in FIGURE 12 except that the breather hole 69 and piston 3 have been omitted, the O ring 66 being retained for the purpose of sealing off the brake fluid from the internal workings of the control valve unit.

All of the embodiments shown in FIGURES 1, 8, 12 and 13 operate in exactly the same way and are here illustrated only to demonstrate that the inner structure of the control valve unit 1 can be varied without departing from the invention.

FIGURE 14 shows another installation of the invention and is presented for the purpose of illustrating that the installation of the invention and particularly the arrangement whereby the constant throttle setting may be adjusted, may also be varied.

In this figure the air filter 46, carburetor 47 and intake manifold 48 of an automotive vehicle are again shown in elevation with the control valve unit 1 mounted on the dashboard 12 as before. The vacuum lines 17 and 35 are connected to the vacuum cylinder 18 and intake manifold 48 respectively as previously described and the hydraulic line 16 is connected to the master brake cylinder which is not shown. A mounting bracket 57 is secured to the top of the carburetor and supports the vacuum cylinder 18, the piston rod 19 of which is provided with a vertical slot 73 in its lower end 72, the slot 73 being in slidable engagement with the end 74 of the throttle lever 60. This slidable engagement is permitted by means of an extended linkage pin 82 and nut 83 with stop-nut 84 as shown in detail in FIGURE 15. The piston rod 19 is also provided with a collar 76 which is secured thereon by the set screw 77.

The operation of the installation just described will now be explained in detail. When the button 45 of the control valve unit 1 is pushed all the way in, the vacuum so created in the vacuum cylinder 18 will cause the piston rod 19 to be drawn upwardly wtih the piston 20 and the end 74 of the throttle lever 60 being in engagement with the bottom of the slot 73 is simultaneously advanced a distance equal to that of the piston stroke. The advanced position of the throttle lever 60 will be constantly maintained by the intake manifold vacuum so long as the button 45 of the control valve unit 1 remains in the so called "on" position. This constantly maintained advanced position of the throttle lever is the constant throttle setting for which this invention is intended and it will be understood that in this installation the position of the constant throttle setting is fully dependent upon the length of the stroke of the piston 20 in the vacuum cylinder 18. To adjust the length of the piston stroke and thereby change the constant throttle setting the piston rod 19 is provided with the collar 76 which is fixed thereon by set screw 77. It will be seen that the length of the stroke of the piston 20 is limited by the positioning of the collar 76 on the piston rod 19 since the piston 20 and the rod 19 can only be drawn upwardly into the vacuum cylinder 18 to the point where the collar 76 affixed to the rod 19 rests against the bottom of the bracket 57. To change the constant throttle setting, it is necessary therefore only to loosen the set screw 77 and move the collar 76 either upwardly or downwardly on the rod 19 to a new position before tightening down on the set screw. To give a lower constant throttle setting the collar 76 is raised to a higher position on the rod 19 so that the piston stroke is shorter and the end 74 of the throttle lever 60 is raised to a lesser degree. Should an increase in the fuel mixture supply be wanted then the collar 76 is moved downwardly to a lower position on the rod 19 so that the permitted piston stroke length is increased and the end 74 of the throttle lever 60 is maintained in a more highly advanced position while the control valve unit 1 is engaged.

The installation shown in FIGURE 14 provides the conveniences of normal driving in that it is disengaged by depressing the brake pedal or by pulling the button 45 out by hand as previously described, either act serving to relieve the vacuum in the vacuum cylinder 18 so that the rod 19 is dropped to its lowest position and does not effect the accelerator linkage system. Thus when the operator wishes to slow down or come to a complete stop, the system illustrated is automatically disengaged upon braking in the normal manner. The arrangement shown equally facilitates normal acceleration in that the slot 73 provides for normal movement of the accelerator linkage when the accelerator pedal is depressed. Should this occur as in the case of desiring more power for the purpose of passing or climbing, the operator can then automatically return to the constant throttle setting merely by taking his foot off the gas pedal and thereby releasing the accelerator linkage to be returned by the accelerator linkage return spring (not shown) until the end 74 of the throttle lever 60 rests against the bottom of the slot 73.

Although the control valve unit 1 has been shown mounted on the dashboard of a vehicle it will be realized that the button could also be conveniently located on the floor of the vehicle so that engagement of the system could be handled by the operator's foot. It is obvious that other modifications or adaptations of the invention may also be made without departing from the spirit and scope of the invention as defined in the hereunto annexed claims.

I claim:

1. A throttle valve control mechanism for providing a constant predetermined throttle setting for a throttle valve of the engine of an automotive vehicle or the like having a fluid operated braking system, said mechanism comprising vacuum operated means connected to the throttle valve of said engine and operable to advance the throttle valve to, and maintain the throttle valve at, a predetermined setting a vacuum supply for supplying a vacuum to said vacuum operated means, a control valve in the vacuum supply to said vacuum operated means for controlling the vacuum supply to said vacuum operated means, manually operated means for opening said control valve, and means responsive to an increase in the brake fluid pressure of the vehicle for closing said control valve and connecting said vacuum operated means instead to the atmosphere whereby to disengage said vacuum operated means from said throttle valve.

2. A throttle valve control mechanism for providing a constant predetermined throttle setting for the engine of an automotive vehicle or the like having a throttle valve controlled by a principal accelerator linkage having a fluid operated braking system, said mechanism comprising, a vacuum operated means including a control linkage connected to the throttle valve of said engine, and operable to advance said throttle valve to, and maintain said throttle valve at, a predetermined setting, said linkage being operable independent of said principal accelerator linkage of the vehicle, conduit means supplying vacuum from the intake manifold of the vehicle to said vacuum operated means whereby to operate said linkage, a manually controlled vacuum control valve in said conduit means for controlling the vacuum supply to said vacuum operated means, and means responsive to an increase in the brake fluid pressure for closing said control valve and connecting said vacuum operated means instead to the atmosphere whereby to disengage said vacuum operated means from said throttle valve.

3. A throttle valve control mechanism for providing a constant predetermined throttle setting for the engine of an automotive vehicle or the like having a hydraulically operated braking system, said mechanism comprising a control linkage operable to move a throttle valve of said engine to a predetermined setting, vacuum operated means for so moving said linkage, conduit means connecting said vacuum controlled means to the vacuum of the intake manifold of the vehicle, a control valve in said conduit means controlling the vacuum supply therethrough, manually controlled means for opening said control valve and release means for closing said control valve and connecting said vacuum operated means instead to the atmosphere and effectively disengaging said control linkage from said throttle valve, said release means being operably responsive to an increase in the pressure of the vehicle's brake fluid.

4. A mechanism according to claim 1 wherein said control linkage includes means for adjusting said predetermined setting.

5. A mechanism according to claim 2 wherein said control linkage includes means for adjusting said predetermined setting.

6. A mechanism according to claim 3 wherein said control linkage includes means for adjusting said predetermined setting.

7. A mechanism according to claim 2 wherein said control linkage is arranged to allow the normal advancement of the accelerator linkage beyond said predetermined setting.

8. A mechanism according to claim 3 wherein said control linkage is arranged to allow the normal advancement of the accelerator linkage beyond said predetermined setting.

9. A mechanism according to claim 1 wherein there is provided means permitting further opening of the throttle valve beyond the predetermined setting, said means being independent of the operation of said vacuum operated means.

10. A mechanism according to claim 1 wherein the vacuum operated means is operated by the vacuum from the intake manifold of the engine.

11. A throttle valve control mechanism according to claim 1 wherein said means for maintaining the throttle valve of said engine at a predetermined setting advances said throttle valve to said predetermined setting when engaged therewith at less than said predetermined setting.

12. A throttle valve control mechanism for selectively providing a constant throttle setting for a throttle valve of the engine of a vehicle having a fluid operated braking system, said mechanism comprising vacuum operated means connected to a throttle valve of said engine and operable to maintain said throttle valve of said engine at a predetermined setting, a vacuum supply for supplying a vacuum to said vacuum operated means, manually controlled means connected in the vacuum supply to said vacuum operated means for controlling the operation of said vacuum operated means, and means operably connecting said manually controlled means to said braking system and effective to cause said manually controlled means to interrupt the vacuum supply to said vacuum operated means upon a change in the hydraulic pressure in said braking system.

13. A throttle valve control mechanism according to claim 12 wherein said means connecting said manually controlled valves to said braking system is responsive only to an increase in the hydraulic pressure in said braking system.

14. In a throttle valve control mechanism for selectively providing a constant predetermined throttle setting for a throttle valve of the engine of a vehicle having a hydraulically operated braking system, a control valve comprising a cylindrically bored open-ended housing, a spool member slidably mounted in said housing and having a manually engageable portion protruding outwardly from one end thereof, stop means for limiting the sliding movement of said spool between first and second positions at each end respectively of the travel of said spool in said housing, a peripheral, longitudinally extending, under-cut portion on said spool, a first port formed in said housing in constant communication with said under-cut portion at all positions of said spool, a second port in said housing, longitudinally displaced from said first port, and in communication with said under-cut portion only when said spool is in said first position thereof, and a relief hole in said housing, longitudinally displaced from said first and second ports and in communication with said under-cut portion only when said spool is in said second position thereof.

15. A control valve according to claim 14 wherein the other end of said housing is closed and has formed therein a third port in communication with the bore in said housing next to the adjacent end of said spool member, whereby to transmit fluid pressure from said braking system to said adjacent end of said spool member, said fluid pressure being effective to move said spool member from said first position thereof to said second position thereof.

References Cited in the file of this patent
UNITED STATES PATENTS

| | | |
|---|---|---|
| 1,718,673 | Wettstein | June 25, 1929 |
| 2,243,354 | Musser | May 27, 1941 |
| 2,284,380 | Drabble | May 26, 1942 |
| 2,423,006 | Chambers et al. | June 24, 1947 |
| 2,609,074 | Leihgeber | Sept. 2, 1952 |
| 2,810,461 | Seay | Oct. 22, 1957 |
| 2,916,116 | Eddy et al. | Dec. 8, 1959 |